United States Patent
O'Reilly et al.

(10) Patent No.: US 8,973,493 B2
(45) Date of Patent: Mar. 10, 2015

(54) SQUARE BALER HAVING FLYWHEEL PLANETARY DRIVE

(71) Applicant: AGCO Corporation, Duluth, GA (US)

(72) Inventors: David W. O'Reilly, McPherson, KS (US); Maynard M. Herron, Hesston, KS (US); Edward W. Esau, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/105,665

(22) Filed: Dec. 13, 2013

(65) Prior Publication Data

US 2014/0165859 A1 Jun. 19, 2014

Related U.S. Application Data

(60) Provisional application No. 61/736,963, filed on Dec. 13, 2012.

(51) Int. Cl.
*A01F 15/08* (2006.01)

(52) U.S. Cl.
CPC ................................. *A01F 15/0841* (2013.01)
USPC .......................................... 100/179; 100/280

(58) Field of Classification Search
CPC ..... A01F 15/0841; F16H 37/041; F16H 1/28; F16H 1/2809; F16H 1/2827
USPC ............... 100/3, 179, 280, 282; 56/10.8, 341; 74/15.4; 475/263, 295, 302
See application file for complete search history.

(56) References Cited

U.S. PATENT DOCUMENTS

| | | | | |
|---|---|---|---|---|
| 4,615,238 A * | 10/1986 | Cheatum | ....................... | 475/263 |
| 5,899,054 A * | 5/1999 | Hawlas et al. | ................... | 56/341 |
| 6,105,353 A * | 8/2000 | Mohr et al. | ...................... | 56/341 |
| 6,701,834 B2 * | 3/2004 | Roth | .............................. | 100/342 |
| 2010/0108413 A1 * | 5/2010 | Lang et al. | ................... | 180/53.1 |

* cited by examiner

*Primary Examiner* — Jimmy T Nguyen

(57) ABSTRACT

A powered square baler is operable to be powered by a prime mover to form a bale by compressing loose material. The powered square baler broadly includes a chassis, a plunger assembly, a flywheel, and a planetary gear train. The chassis includes a baler frame that presents a baling chamber to receive the loose material. The plunger assembly includes a reciprocating plunger head slidably mounted relative to the baler frame and operable to reciprocate into and out of the chamber and apply a compressive force to the loose material. The flywheel is rotatably mounted on the chassis and is operable to be driven by the prime mover. The planetary gear train is drivingly attached to the flywheel and is drivingly attached relative to the plunger assembly to transmit power between the flywheel and the plunger assembly and thereby drive the plunger head.

12 Claims, 7 Drawing Sheets

US 8,973,493 B2

SQUARE BALER HAVING FLYWHEEL PLANETARY DRIVE

CROSS REFERENCE TO RELATED APPLICATION

This application claims the benefit of U.S. Provisional Application No. 61/736,963, entitled SQUARE BALER HAVING FLYWHEEL PLANETARY DRIVE filed Dec. 13, 2012, which is hereby incorporated by reference in its entirety.

BACKGROUND OF THE INVENTION

1. Field of Invention

This invention relates to a baling apparatus, and more particularly to a baler having a planetary gear train drivingly attached to a flywheel and drivingly attached relative to a plunger assembly to transmit power between the flywheel and the plunger assembly to drive a plunger head.

2. Description of Related Art

Conventional square hay balers are typically driven by a power-take-off system of an agricultural tractor and are driven along a field by the tractor. Conventional balers include a reciprocating plunger that slides into and out of a baling chamber. As the chamber receives loose hay material, the plunger slides into the chamber during a compaction stroke to compress the loose hay material into the form of a bale. Such balers also typically include a gearbox that transmits power to the reciprocating plunger and includes intermeshing gears.

Prior art hay balers require the application of large cyclical forces to the plunger. Forces are relatively high during the compaction stroke, and particularly when loose material is being compacted. However, during a plunger retraction stroke and during other parts of the compaction stroke, the forces required to move the plunger are generally much lower. Because this highly cyclical power requirement can be harmful to the power-take-off system and drive train of the tractor, prior art hay balers also include a flywheel that operates as an energy buffer.

However, prior art square hay balers have certain deficiencies. For instance, the relatively high inertia of conventional baler flywheels causes startup of the baler to be difficult. In particular, engagement of the power-take-off to start the baler can cause stalling of the tractor engine. The use of a flywheel in prior art balers to eliminate exposure of the power-take-off to harmful cyclical loading is only somewhat effective.

OVERVIEW OF THE INVENTION

In one embodiment, the invention is directed to a powered square baler operable to be powered by a prime mover to form a bale by compressing loose material. The powered square baler broadly includes a chassis, a plunger assembly, a flywheel, and a planetary gear train. The chassis includes a baler frame that presents a baling chamber to receive the loose material. The plunger assembly includes a reciprocating plunger head slidably mounted relative to the baler frame and operable to reciprocate into and out of the chamber and apply a compressive force to the loose material. The flywheel is rotatably mounted on the chassis and is operable to be driven by the prime mover. The planetary gear train is drivingly attached to the flywheel and is drivingly attached relative to the plunger assembly to transmit power between the flywheel and the plunger assembly and thereby drive the plunger head.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
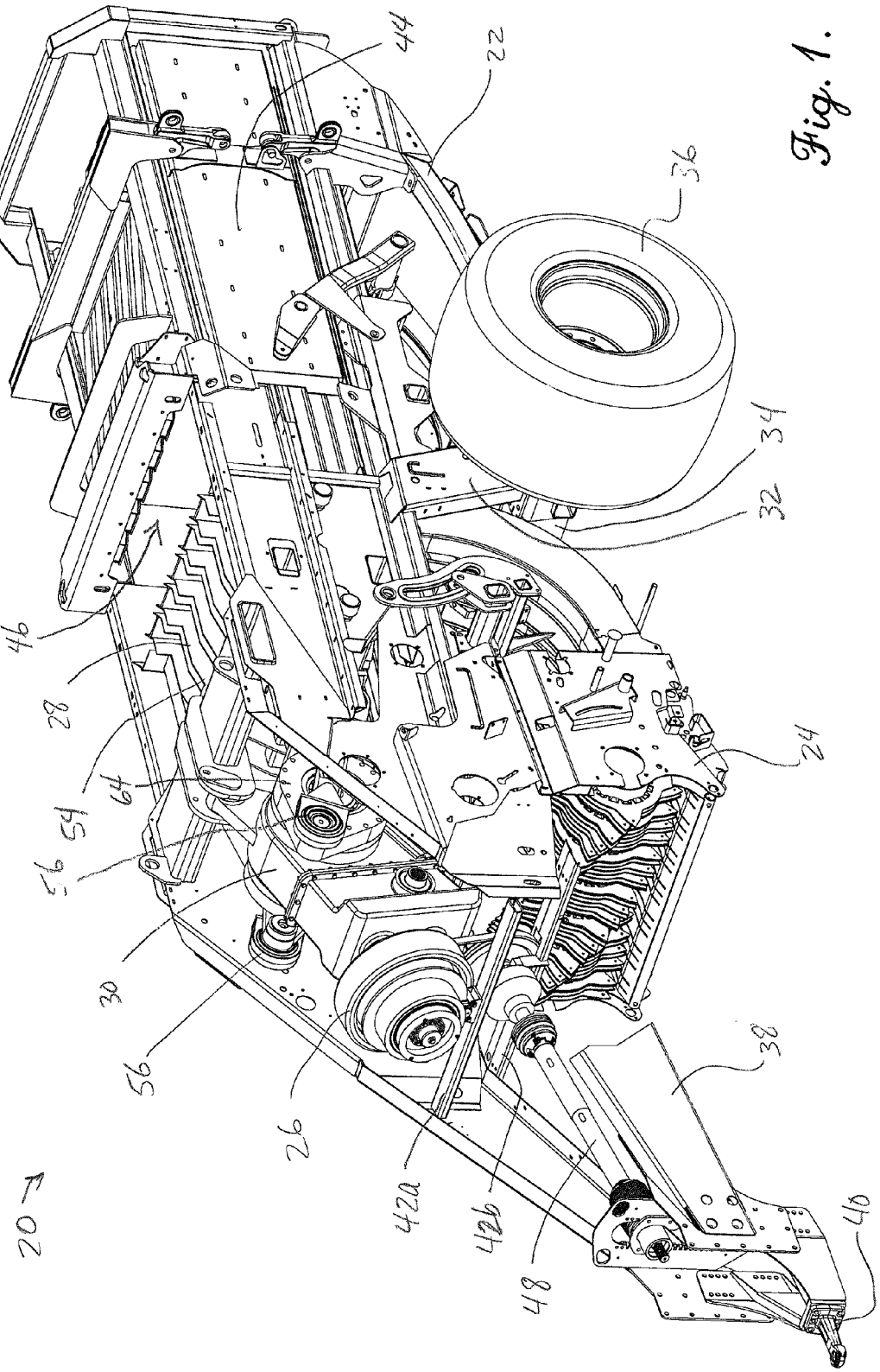
FIG. 1 is a fragmentary front perspective of a square baler constructed in accordance with a preferred embodiment of the present invention, with the square baler including a wheeled chassis, a windrow pickup header, a baler input shaft, a transmission, a plunger drive, and a plunger assembly, with a plunger head of the plunger assembly being slidably mounted in a baling chamber presented by the chassis.

Turning initially to FIG. 1, a square baler 20 is constructed in accordance with a preferred embodiment of the present invention. The illustrated baler 20 is designed to collect loose hay and to form the loose hay into hay bales. However, the principles of the present invention are applicable where the baler 20 forms bales from other loose materials, such as other vegetation or waste material. The square baler 20 preferably includes a wheeled chassis 22, a windrow pickup header 24, a transmission 26, a plunger assembly 28, and a planetary plunger drive 30.

The wheeled chassis 22 is conventional and is constructed so that the baler 20 can be towed in the usual manner by a conventional agricultural tractor (not shown). However, the baler 20 could be operated by a prime mover other than a tractor without departing from the scope of the present invention.

The chassis 22 includes a baler frame 32, an axle 34 that supports the baler frame 32, and ground wheels 36 rotatably mounted on the axle 34. The illustrated baler frame 32 preferably includes a tow bar assembly 38 operable to be attached to the tractor with a hitch 40. The baler frame 32 further includes lateral supports 42a,b.

The baler frame 32 also preferably includes an enclosed bed 44 that presents a baling chamber 46. As will be discussed, the bed 44 slidably receives the plunger assembly 28 so that the plunger can reciprocate into and out of the baling chamber 46 along a longitudinal chamber axis. More specifically, the plunger travels into the baling chamber 46 during a compaction stroke and out of the baling chamber 46 during a retraction stroke.

The header 24 is operably supported by the baler frame 32 at a location spaced between the hitch 40 and axle 34. In the usual manner, the header 24 is operable to collect loose material from the ground and feed the collected material toward the baling chamber 46.

Figure 2:
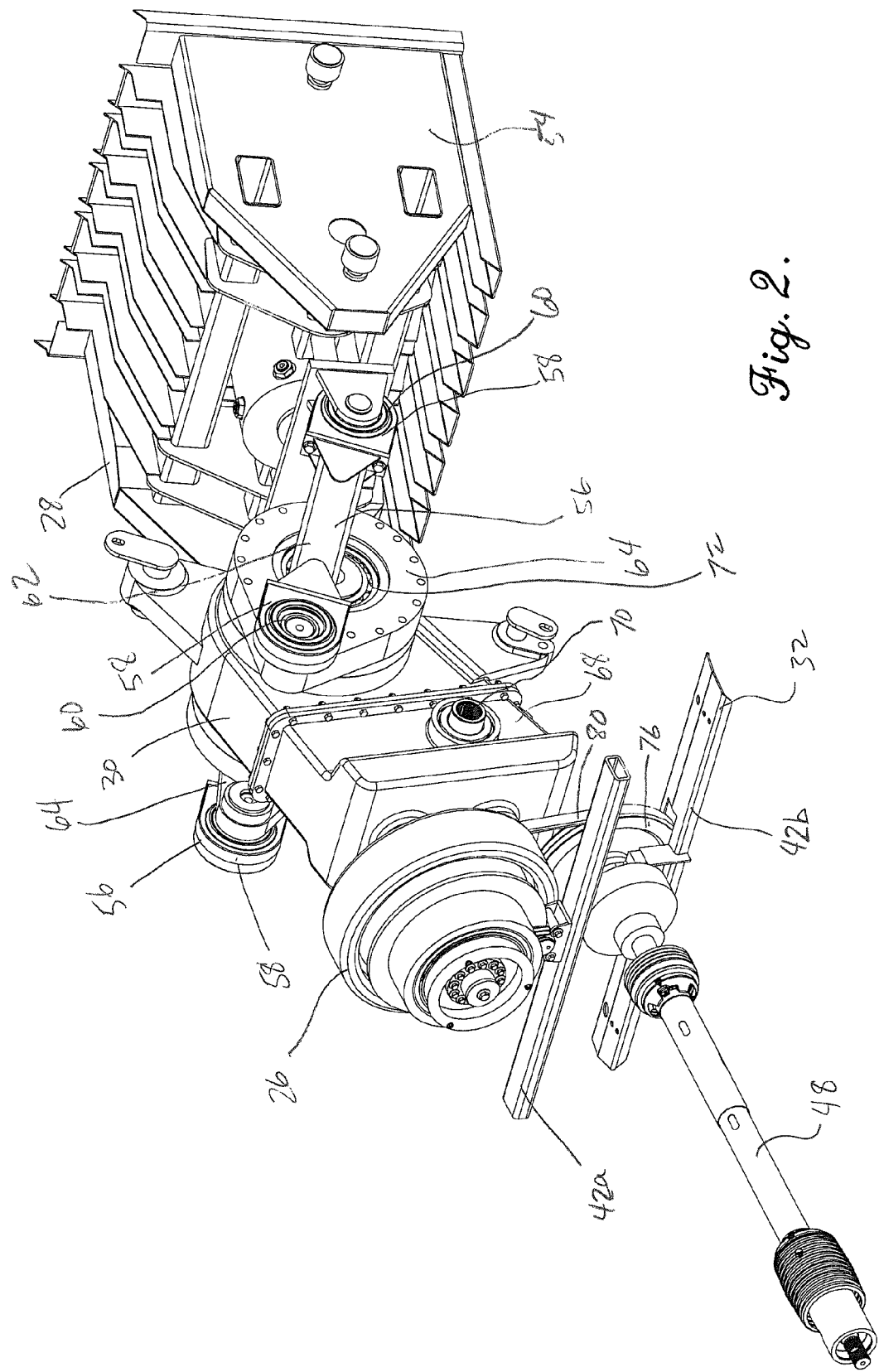
FIG. 2 is a fragmentary front perspective of the square baler shown in FIG. 1, showing the baler input shaft, transmission, plunger drive, and plunger assembly, with the plunger drive including crank arms attached to connecting rods of the plunger assembly, and the connecting rods attached to the plunger head, and with the crank arms rotated so that the plunger assembly is in an outermost location relative to the baling chamber.
Figure 3:
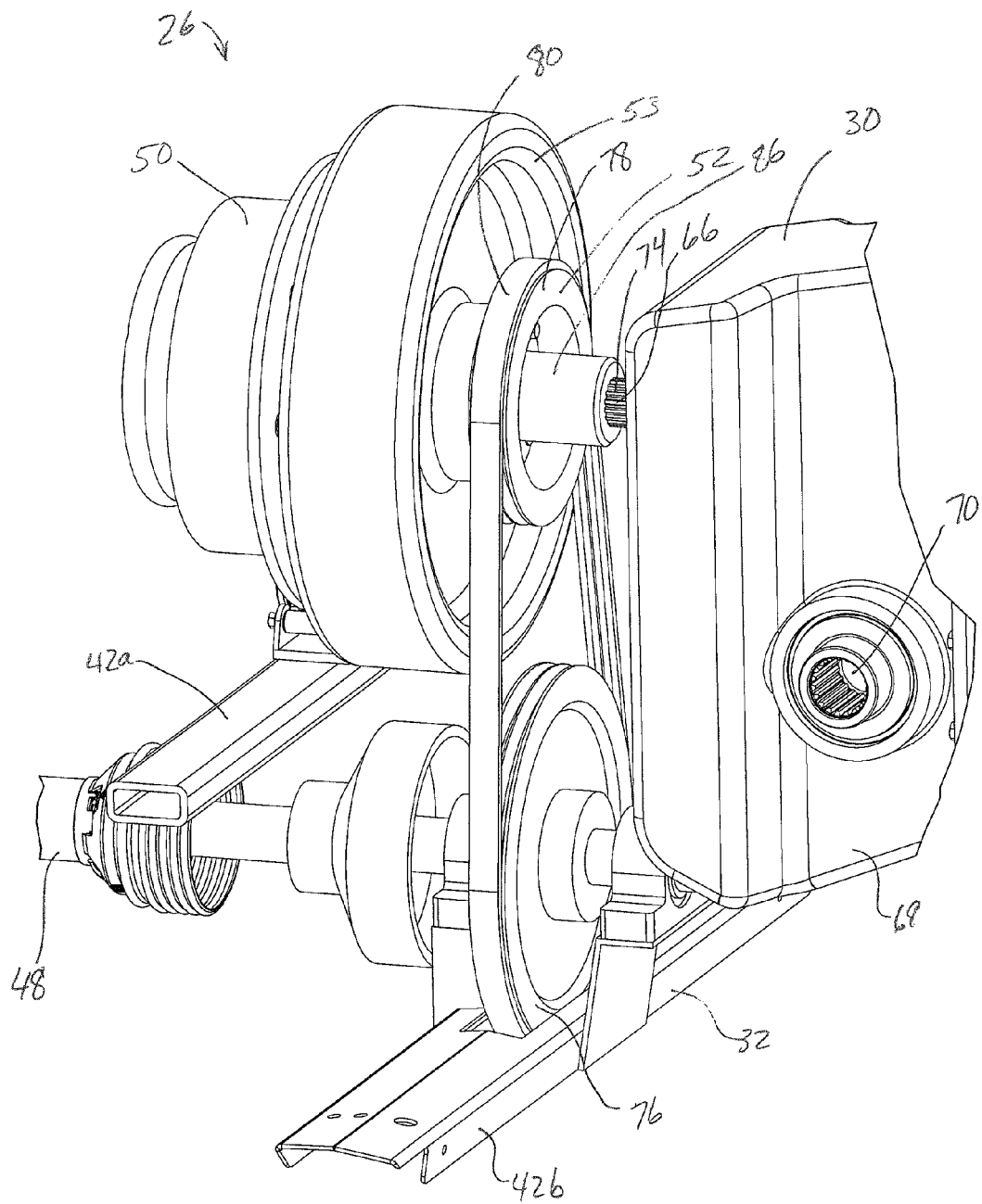
FIG. 3 is a fragmentary side perspective of the square baler shown in FIGS. 1 and 2, showing a belt drive, planetary gear drive, and flywheel of the transmission mounted on lateral supports of the chassis.

Turning to FIGS. 1-3, the transmission 26 serves to transmit power from a baler input shaft 48 to the plunger drive 30. Preferably, the illustrated transmission 26 reduces the rotational speed from the baler input shaft 48 to an input shaft of the plunger drive 30. The baler input shaft 48 is conventional and is operable to be attached to a power take-off shaft (not shown) of the tractor. The illustrated baler input shaft 48 preferably operates at a PTO speed that ranges from about one thousand (1,000) revolutions per minute (RPM) to about one thousand three hundred (1,300) RPM. As will be discussed in greater detail, the transmission 26 preferably includes a planetary gear drive 50 and a belt drive 52 to provide the speed reduction. The transmission 26 further includes a flywheel 53.

Turning to FIGS. 1 and 2, the plunger assembly 28 is constructed to reciprocate into and out of the chamber 46 along the chamber axis to form a bale (not shown). In such operation, the plunger assembly 28 compacts and forms material in the chamber 46 so that the bale is formed. The plunger assembly 28 preferably includes a plunger head 54 and connecting rods 56.

The plunger head 54 is preferably slidable into the baling chamber 46 during a compaction stroke and out of the baling chamber 46 during a retraction stroke. The plunger head 54 and baling chamber 46 cooperatively define an enclosed chamber volume. The volume has a maximum value when the plunger head 54 is at an outermost location relative to the chamber 46 (see FIGS. 1 and 2). Conversely, the volume has a minimum value when the plunger head 54 is at an innermost location (not shown) relative to the chamber 46.

The connecting rods 56 each include end housings 58, bearings 60 mounted in each of the end housings 58, and an arm 62 that interconnects the end housings. Each connecting rod 56 is pivotally attached to a crank arm 64 of the plunger drive 30 at one end and to the plunger head 54 at the other end.

The connecting rods 56 drivingly interconnect the crank arms 64 and plunger head 54 so that rotation of the crank arms 64 causes reciprocating sliding movement of the plunger head 54 into and out of the chamber 46. The crank arms 64 and plunger assembly 28 operate so that the crank arms 64 are rotatable between the outermost location (see FIGS. 1 and 2) and the innermost location.

The plunger drive 30 is operable to transmit power from the transmission 26 to the plunger assembly 28. The plunger drive 30 is particularly designed to accommodate the transmission of high torque loads so that correspondingly high compression forces can be applied to material in the baling chamber 46 by the plunger head 54. At the same time, the illustrated plunger drive 30 preferably provides a suitable speed reduction from a drive input shaft 66 to the pair of rotating crank arms 64. The illustrated plunger drive 30 preferably includes, among other things, a housing assembly 68, the drive input shaft 66, an auxiliary gear train 70, a pair of planetary gear trains 72, and the rotating crank arms 64.

Figure 4:
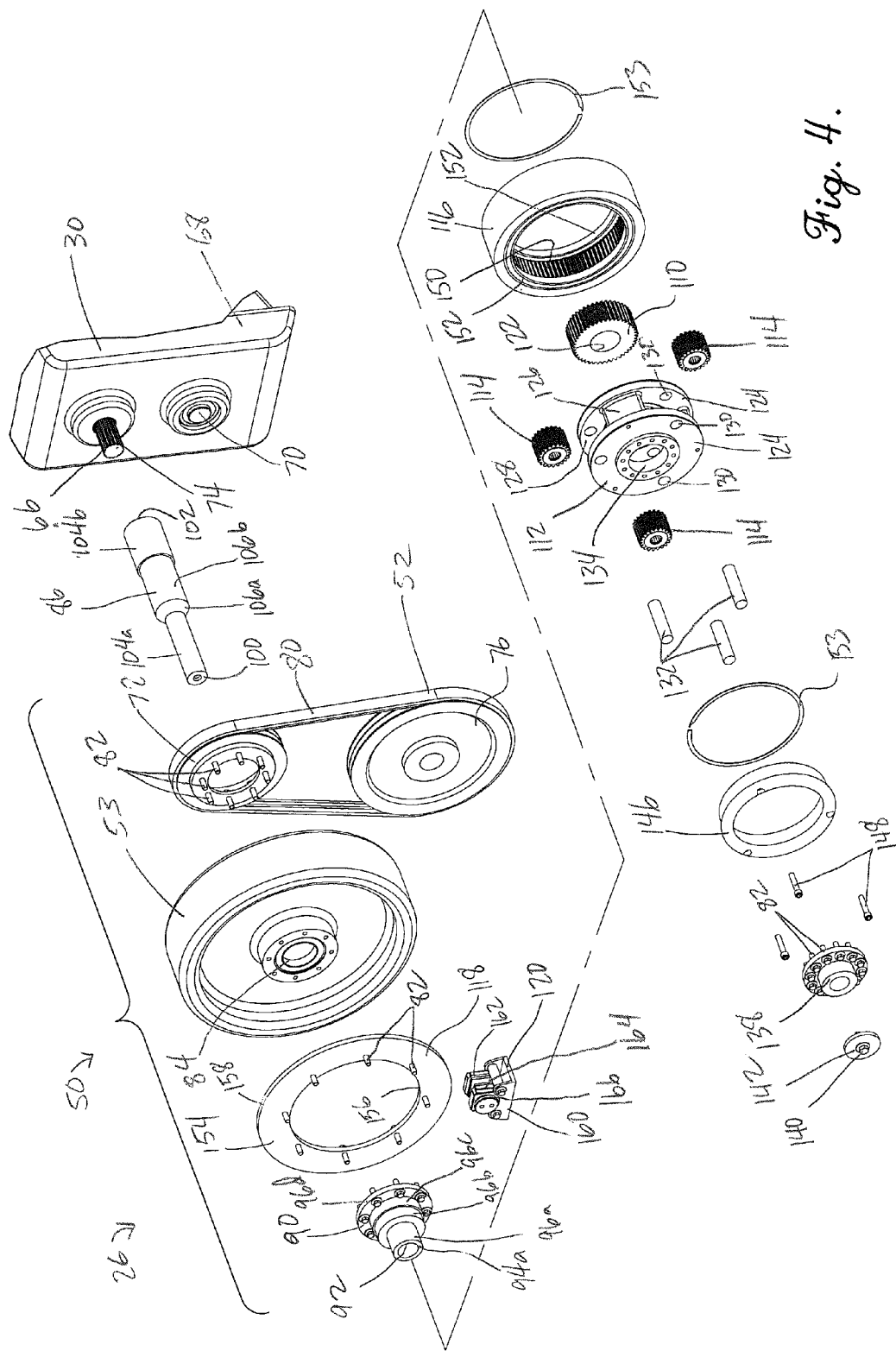
FIG. 4 is a fragmentary exploded view of the square baler shown in FIGS. 1-3, showing the belt drive, planetary gear drive, and flywheel exploded from the input shaft of the plunger drive.
Figure 5:
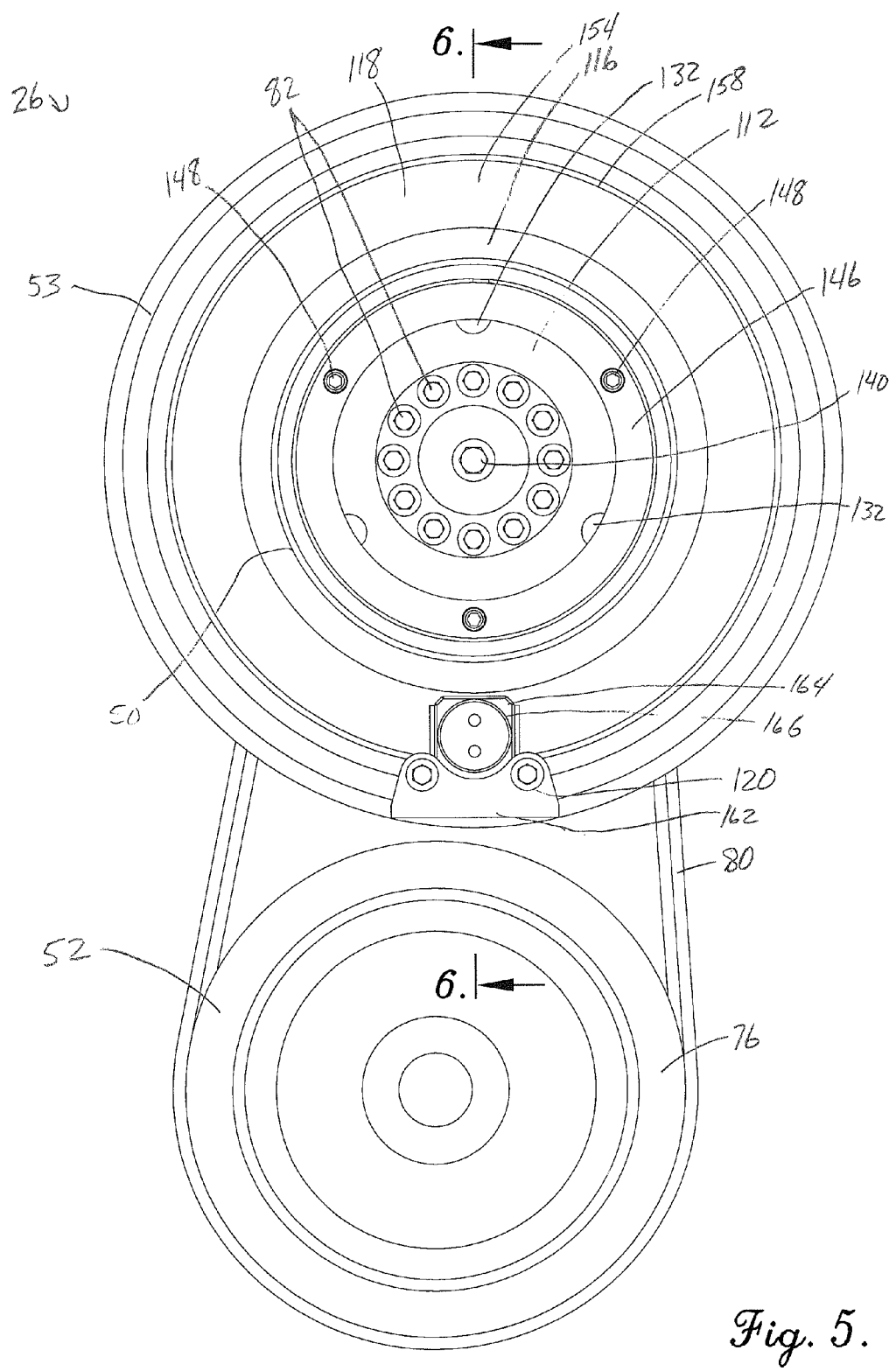
FIG. 5 is a fragmentary front elevation of the square baler shown in FIGS. 1-4, showing the belt drive, planetary gear drive, and flywheel.

The drive input shaft 66 is preferably unitary and presents a forward splined end 74 (see FIGS. 3 and 4). The drive input shaft 66 is rotatably supported in the housing assembly by bearings (not shown) located adjacent respective ends of the drive input shaft 66, with the splined end 74 being located exterior to the housing assembly 68.

Turning to FIGS. 2-7, the transmission 26 preferably includes the planetary gear drive 50, the belt drive 52, and the flywheel 53. The illustrated belt drive 52 includes a drive sheave 76, a driven sheave 78, and an endless belt 80 drivingly entrained about the sheaves 76,78. The drive sheave 76 is mounted on the baler input shaft 48 to rotate therewith. The driven sheave 78 is mounted on the flywheel 53 to rotate therewith. Thus, the belt drive 52 transmits power between the baler input shaft 48 and the flywheel 53.

The driven sheave 78 is preferably smaller than the drive sheave 76 so that the belt drive 52 increases the rotational speed from the drive sheave 76 to the driven sheave 78. Preferably, the belt drive 52 has a speed increasing ratio that ranges from about 1:1.5 to about 1:5 and, more preferably, ranges from about 1:2 to about 1:3. With the baler input shaft 48 rotating at a speed ranging from about 1,000 RPM to about 1,300 RPM, the driven sheave 78 preferably rotates at a driven speed that ranges from about two thousand (2,000) RPM to about three thousand (3,000) RPM. The driven sheave 78 is removably mounted to the flywheel 53 with fasteners 82 so that the driven sheave 78 rotates with the flywheel 53. It has been found that increasing the rotational speed from the baler input shaft 48 to the flywheel 53 permits the flywheel 53 to be reduced in size compared to conventional flywheels and, at the same time, provide a suitable energy buffer between the baler input shaft 48 and the plunger drive 30.

The illustrated belt drive 52 is preferred for increasing the rotational speed from the drive sheave 76 to the driven sheave 78. However, it is also within the ambit of the present invention where an alternative drive mechanism is used, such as a gear train. Furthermore, a chain drive with a pair of sprockets and an endless chain could be used as an alternative drive mechanism.

In the usual manner, the flywheel 53 provides a relatively large mass compared to the other components of the transmission 26, with the flywheel 53 having a relatively large moment of inertia. The illustrated flywheel 53 is preferably unitary and presents an axial bore 84. The flywheel 53 is mounted on a transmission output shaft 86 of the planetary gear drive 50 so that the output shaft 86 extends through the bore 84. The flywheel 53 is rotatably mounted on the output shaft 86 with bearings 88 so that the flywheel 53 can spin freely relative to the output shaft 86 (see FIG. 6).

Figure 6:
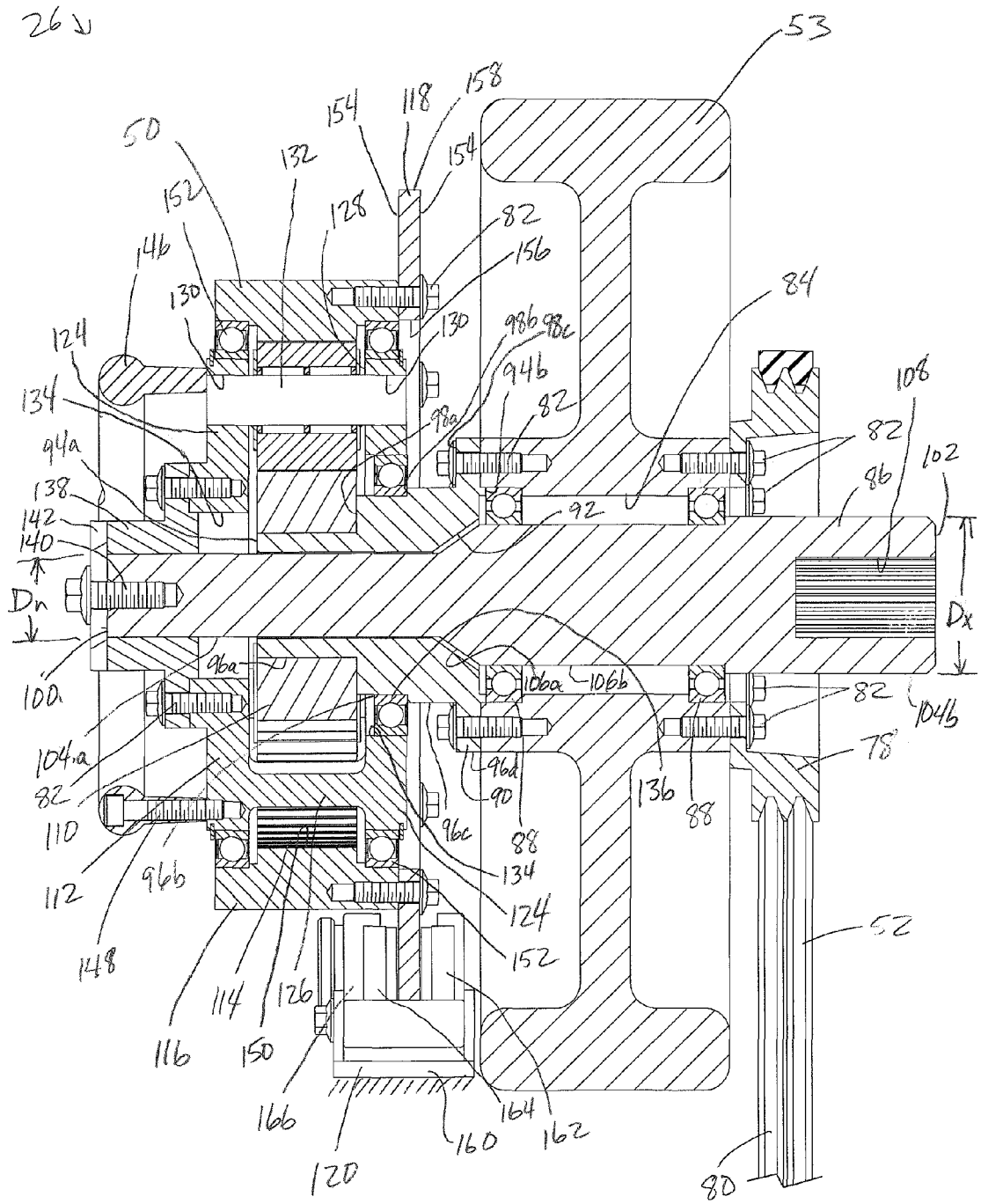
FIG. 6 is a fragmentary cross section of the belt drive, planetary gear drive, and flywheel taken along line 6-6 in FIG. 5.
Figure 7:
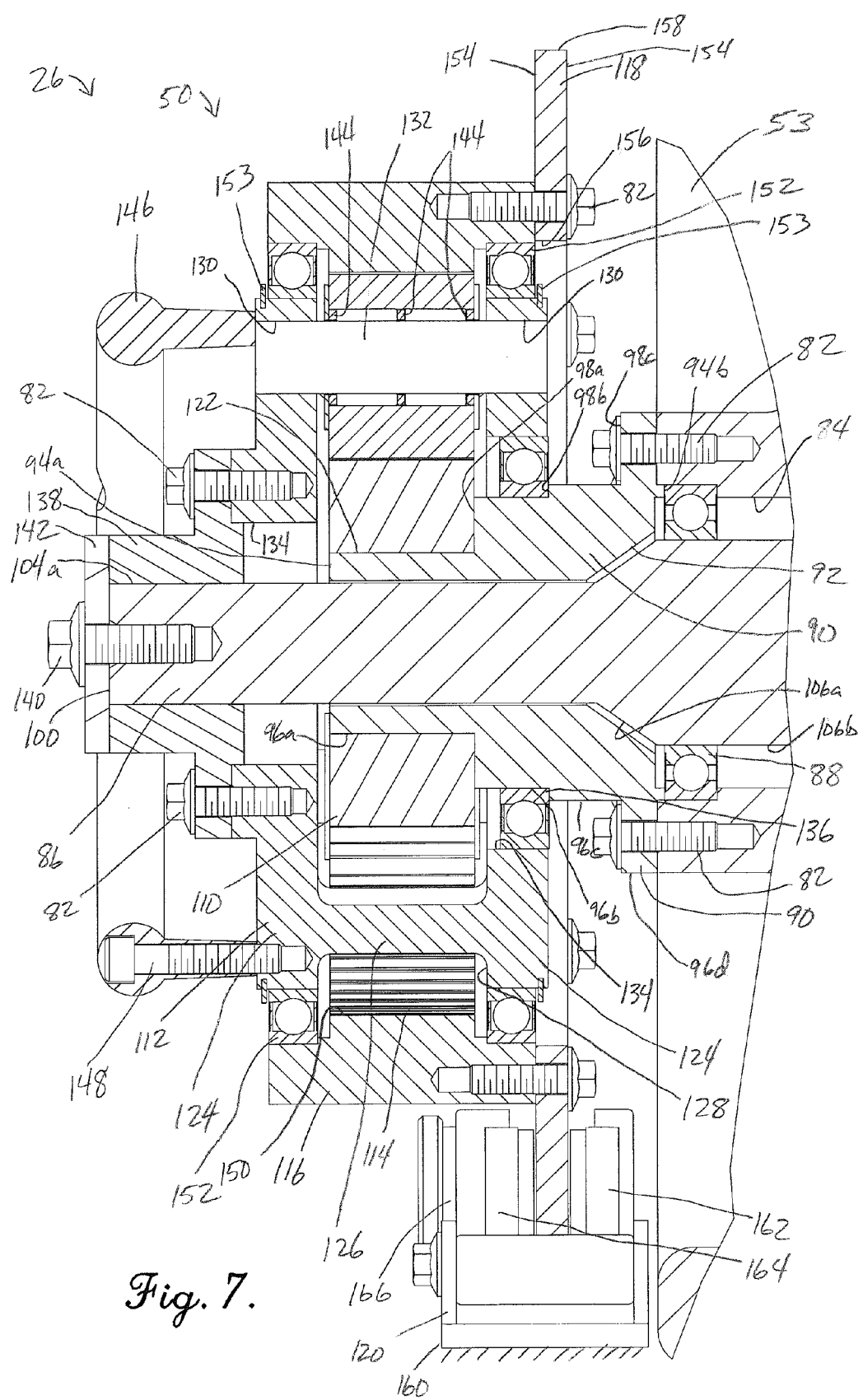
FIG. 7 is an enlarged fragmentary cross section of the planetary gear drive and flywheel shown in FIGS. 1-6.

Turning to FIGS. 4, 6, and 7, the transmission 26 also includes an inner hub 90. The inner hub 90 is unitary and presents an axial bore 92, end surfaces 94a,b, curved surfaces 96a-d, and shoulder 98. The inner hub 90 is removably mounted on the flywheel 53 with fasteners 82 by engaging the end surface 94b with the flywheel 53. Because the flywheel 53 is attached to the driven sheave 78, rotation of the baler input shaft 48 causes corresponding rotation of the flywheel 53 and the inner hub 90.

The output shaft 86 is preferably unitary and presents forward and aft shaft ends 100,102. The output shaft 86 also presents curved end surfaces 104a,b and curved intermediate surfaces 106a,b that extend between the end surfaces 104. Yet further, the output shaft 86 presents a splined bore 108 that extends from the aft shaft end 102. The splined bore 108 is configured to be slidably mounted on the forward splined end 74 of the drive input shaft 66 so that the output shaft 86 is cantilevered from the drive input shaft 66.

The end surface 104b presents a maximum diameter dimension Dx of the output shaft 86, and the end surface 104a presents a minimum diameter dimension Dn (see FIG. 6). The intermediate section 106b presents a diameter dimension that is between the minimum and maximum diameter dimensions Dn,Dx.

The intermediate surface 106b preferably receives bearings 88 that support the flywheel 53. The inner hub 90 extends along intermediate and end surfaces 104a,106a, with the surfaces 104a,106a generally being spaced from the bore 92 of the inner hub 90 to permit free relative rotational movement therebetween. However, the inner hub 90 could also be directly mounted to the output shaft 86 with one or more bearings.

Turning to FIGS. 4-7, the planetary gear drive 50 provides a preferred speed reduction mechanism between the flywheel 53 and the output shaft 86. The planetary gear drive 50 also preferably provides a clutch mechanism that allows the planetary gear drive 50 to selectively transmit power between the flywheel 53 and the output shaft 86. The planetary gear drive 50 preferably includes a sun gear 110, a carrier 112, planet gears 114, ring gear 116, clutch disc 118, and a caliper clutch assembly 120.

The illustrated planetary gear drive 50 preferably has a planetary speed reduction ratio from the flywheel 53 to the output shaft 86 that ranges from about 2:1 to about 10:1. More preferably, the planetary speed reduction ratio is about 3:1.

The illustrated sun gear 110 comprises a unitary toothed gear that presents a bore 122. The sun gear 110 is preferably mounted on the inner hub 90 to rotate with the inner hub 90. More specifically, the sun gear 110 is mounted so that the bore 122 is received on and engages the curved surface 96a.

The carrier 112 includes a pair of plates 124 and walls 126 that interconnect the plates 124 to cooperatively form a rigid gear carrying structure and present an open space 128 between the plates 124. The plates 124 also present bores 130 that receive shafts 132 and a central bore 134.

The carrier 112 is rotatably mounted on the inner hub 90 with a bearing 136 that is secured in the central bore 134 and mounted on curved surface 96b. Thus, the carrier 112 is operable to spin relative to the inner hub 90. The carrier 112 is also mounted to the output shaft 86 with an outer hub 138, fastener 140, and washer 142. The outer hub 138 is secured to the plate 124 with fasteners 82. Thus, the carrier 112 spins with the output shaft 86.

The fasteners 82 associated with the outer hub 138 preferably serve as shear pins. Thus, in the event that torque applied by the carrier 112 to the output shaft 86 exceeds a predetermined torque value, the shear pins would fail so that the carrier 112 can spin relative to the output shaft 86.

Each planet gear 114 comprises a toothed gear that presents a bore. The planet gears 114 are rotatably mounted on respective shafts 132 by bearings 144 (see FIG. 7). Furthermore, the planet gears 114 are mounted within the open space 128. The planet gears 114 are preferably in meshing interengagement with the sun gear 110, with rotation of the sun gear 110 causing corresponding rotation of the planet gears 114.

The planetary gear drive 50 also includes a manual wheel grip 146. The wheel grip 146 is unitary and comprises an annular ring mounted on the carrier 112 with fasteners 148.

The ring gear 116 is unitary and presents an interior surface including a toothed surface 150. The ring gear 116 is rotatably mounted on the carrier 112 with bearings 152 located on opposite sides of the toothed surface 150. The bearings 152 are held relative to the carrier 112 with snap rings 153 (see FIG. 7). The ring gear 116 is mounted in meshing interengagement with the planet gears 114.

The clutch disc 118 comprises a plate with opposite braking surfaces 154 and concentric inner and outer margins 156,158. The clutch disc 118 is mounted to the ring gear 116 with fasteners 82 so that the clutch disc 118 and ring gear 116 rotate with each other. The outer margin 158 is spaced radially outwardly from the ring gear 116 so that the braking surfaces 154 are exposed. While the illustrated clutch disc 118 is mounted to the ring gear 116, it is within the scope of the present invention to mount the clutch disc 118 to another part of the planetary gear drive 50, such as the carrier 112 (e.g., to provide alternative planetary gear drive operation).

Turning to FIGS. 2-7, the caliper clutch assembly 120 preferably provides a frictional braking mechanism that can selectively frictionally engage the clutch disc 118. The caliper clutch assembly 120 includes a frame 160, a fixed pad 162, and a shiftable pad 164 powered by a piston 166. The fixed pad 162 is attached to the frame 160. The shiftable pad 164 is slidably mounted on the frame 160. The shiftable pad 164 can be selectively moved by the operator between a braking condition where the pads 162,164 are relatively close to one another and a releasing condition where the pads 162,164 are relatively further away from one another when compared to the braking condition. The pads 162,164 can also be shifted to one of numerous positions between the braking and releasing condition (e.g., to provide continuously variable braking adjustment between the braking and releasing conditions).

The caliper clutch assembly 120 is preferably mounted on lateral support 42a (see FIGS. 2 and 3). Thus, the caliper clutch assembly 120 is securely supported by the wheeled chassis 22. In the braking condition, the pads 162,164 are frictionally engaged with corresponding braking surfaces 154 to restrict rotation of the clutch disc 118 and ring gear 116. In the releasing condition, the shiftable pad 164 is moved out of substantial frictional engagement with the clutch disc 118 to permit free rotation of the clutch disc 118 and ring gear 116. However, it will be appreciated that, in the releasing condition, one or both of the pads 162,164 could have some frictional engagement with the clutch disc 118 but still permit free rotation of the clutch disc 118 and ring gear 116. Again, the caliper clutch assembly 120 is preferably shiftable continuously among numerous positions between the braking and releasing conditions (e.g., to provide for continuously variable braking adjustment between the braking and releasing conditions).

The illustrated caliper clutch assembly 120 is preferably normally in the releasing condition (i.e., the clutch is normally open such that it is not frictionally engaged). Thus, the illustrated caliper clutch assembly 120 is normally frictionally disengaged from the clutch disc 118. As will be discussed, the normally open clutch arrangement causes the planetary gear drive 50 to restrict power transmission in the event that the tractor loses power.

The caliper clutch assembly 120 provides a preferred braking mechanism for the planetary gear drive 50. However, it is within the ambit of the present invention where an alternative frictional brake device is used to selectively restrict the ring gear 116 from rotating. Furthermore, while the caliper clutch assembly 120 preferably uses frictional engagement to restrict ring gear rotation, the planetary gear drive 50 could have a mechanism with a positive mechanical stop (such as a pin that engages a corresponding notch in the clutch disc 118) to selectively restrict ring gear rotation.

It is also within the ambit of the present invention where the caliper clutch assembly 120 operates to restrict rotation of a component of the planetary gear drive 50 other than the ring gear 116. For instance, the caliper clutch assembly 120 could be constructed to selectively control rotation of the carrier 112, e.g., where the clutch disc 118 is mounted directly to the carrier 112.

Turning to FIG. 7, when the caliper clutch assembly 120 is in the braking condition, the caliper clutch assembly 120 frictionally restricts rotation of the ring gear 116 during operation of the planetary gear drive 50. Thus, in the braking condition, rotation of the flywheel 53 causes rotation of the sun gear 110, which causes rotation of the planet gears 114. Because the ring gear 116 does not rotate, rotation of the planet gears 114 causes corresponding rotation of the carrier 112, which in turn causes rotation of the output shaft 86. In this manner, the planetary gear drive 50 transmits power from the flywheel 53 to the output shaft 86.

The ring gear 116 of the illustrated planetary gear drive 50 is preferably held substantially stationary by the caliper clutch assembly 120 in the braking condition. However, for some aspects of the present invention, the caliper clutch assembly 120 could be used to hold another part of the planetary gear drive 50 from rotating in the braking condition. For instance, the caliper clutch assembly 120 could be operated to selectively hold the carrier 112 from rotating.

When the caliper clutch assembly 120 is in the releasing condition, the caliper clutch assembly 120 is substantially frictionally disengaged from the clutch disc 118 to permit free rotation of the clutch disc 118 and ring gear 116. Again, one or both of the pads 162,164 could have some frictional engagement with the clutch disc 118 but still permit free rotation of the clutch disc 118 and ring gear 116 when the caliper clutch assembly 120 is in the releasing condition.

Because the caliper clutch assembly 120 is disengaged to permit rotation of the ring gear 116, the planetary gear drive 50 restricts power transmission from the flywheel 53 to the output shaft 86. In particular, rotation of the flywheel 53 and the sun gear 110 causes rotation of the planet gears 114 and corresponding rotation of the ring gear 116 without resulting in rotation of the carrier 112 and the output shaft 86. In this manner, when the caliper clutch assembly 120 is disengaged, the planetary gear drive 50 preferably provides a slip mechanism that restricts power transfer to the output shaft 86.

The inclusion of the caliper clutch assembly 120 as part of the planetary gear drive 50 preferably enables the planetary gear drive 50 to be selectively configured for power transmission. It has been found that this configuration is particularly useful during baler operation. For instance, the caliper clutch assembly 120 can be disengaged when power to the baler input shaft 48 is initially engaged. This allows the tractor or other power source to bring the baler input shaft 48, belt drive 52, and flywheel 53 up to a desired rotational speed without driving the plunger drive 30 or the plunger assembly 28. As a result, the flywheel 53 can be brought up to the desired speed while minimizing the possibility of stalling the tractor or other power source.

Again, the caliper clutch assembly 120 is preferably normally in the releasing condition so that the caliper clutch assembly 120 is normally frictionally disengaged from the clutch disc 118. This normally-open brake arrangement allows the planetary gear drive 50 to restrict power transmission between the flywheel 53 and the output shaft 86 if the tractor loses power. For instance, if the tractor stalls (e.g., because too much material in the baling chamber 46 has caused the plunger assembly 28 to bind), the caliper clutch assembly 120 automatically disengages so that the planetary gear drive 50 is unable to transmit power. In the event of a stall condition, it has been found that this brake configuration allows the plunger drive 30, plunger assembly 28, and flywheel 53 to continue moving (due to the significant inertia of these components) without causing damage to the baler input shaft 48 or to the tractor (such as the tractor power-take-off or other components of the tractor power train).

The caliper clutch assembly 120 is operable to be shifted by a controller (not shown) to shift between the braking and releasing conditions. In addition, the controller is preferably operable with the caliper clutch assembly 120 to continuously shift the caliper clutch assembly 120 among numerous brake conditions between the braking and releasing conditions. In this manner, the controller and caliper clutch assembly 120 cooperatively permit continuously variable braking adjustment. In this manner, the controller and caliper clutch assembly 120 cooperate to control the amount of torque transmitted between the flywheel 53 and the output shaft 86 by the planetary gear drive 50. The controller could include a system that senses torque transmitted by the planetary gear drive 50 (e.g., by using conventional torque sensors). The controller could also include control elements, including hardware and/or software, to utilize sensed torque and other conditions for automatically adjusting the braking condition of the caliper clutch assembly 120. The controller preferably includes a programmable logic controller. However, those skilled in the art will appreciate that the controller could be variously configured to operate the caliper clutch assembly 120

In operation, the baler 20 is powered by driving the baler input shaft 48 so that the plunger is reciprocated into and out of the baling chamber 46. Rotation of the baler input shaft 48 powers the belt drive 52 and the planetary gear drive 50, with the planetary gear drive 50 powering the plunger drive 30. The plunger drive 30 powers the crank arms 64, which causes reciprocating movement of the plunger head 54.

During initial baler startup, the caliper clutch assembly 120 is preferably selectively placed in the releasing condition so that the planetary gear drive 50 transmits substantially no power between the flywheel 53 and the output shaft 86. Thus, as the power-take-off of the tractor begins to spin the baler input shaft 48, the belt drive 52 and the flywheel 53 also begin spinning. At the same time, the planetary gear drive 50 transmits substantially no power from the flywheel 53 to the plunger drive 30 and plunger assembly 28.

Once the baler input shaft 48, belt drive 52, and flywheel 53 reach a desired speed, the caliper clutch assembly 120 can be shifted from the releasing condition to the braking condition by the baler operator (or by the controller in response to a sensed speed of the baler input shaft 48, belt drive 52, and/or the flywheel 53). Shifting from the releasing condition to the braking condition can be performed at various rates to provide a preferred transition into operation of the plunger drive 30 and plunger assembly 28. For instance, shifting from the releasing condition to the braking condition may occur over a period of time that ranges from one (1) second to ten (10) seconds so that movement of the plunger can be initiated without damaging the baler and/or the tractor.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A powered square baler operable to be powered by a prime mover to form a bale by compressing loose material, the powered square baler comprising:
   a baler input shaft powered by the prime mover;
   a chassis, the chassis including a baler frame that presents a baling chamber to receive the loose material;
   a plunger assembly, the plunger assembly including a reciprocating plunger head slidably mounted relative to the baler frame and operable to reciprocate into and out of the chamber and apply a compressive force to the loose material and at least one connecting arm coupled to the plunger head;
   a plunger drive powering the plunger assembly, the plunger drive comprising a rotating drive input shaft and at least one crank arm coupled to the at least one connecting arm;
   a transmission assembly connecting the baler input shaft to the drive input shaft, the transmission assembly comprising:
      a flywheel, the flywheel rotatably mounted on the chassis and operable to be driven by the prime mover; and
      a planetary gear train, the planetary gear train drivingly attached to the flywheel and drivingly attached to a transmission output shaft connected to the drive input shaft of the plunger drive powering the plunger assembly to transmit power between the flywheel and the plunger assembly and thereby drive the plunger head, the planetary gear train comprising a sun gear, a carrier, a plurality of planet gears, a ring gear, a clutch disc, and a caliper clutch assembly, the carrier being mounted on the transmission output shaft and the clutch disc being mounted to the ring gear so that the clutch disc and ring gear rotate with each other, the caliper clutch assembly providing a frictional braking mechanism that can selectively frictionally engage the clutch disc to restrict rotation of the ring gear and thereby transmit power from the flywheel to the transmission output shaft in a braking condition, and when disengaged from the clutch disc in a releasing condition, the rotation of the flywheel does not cause rotation of the transmission output shaft such that the prime mover can rotate the flywheel at a desired rotational speed without driving the plunger drive or the plunger assembly.

2. The powered square baler of claim 1 wherein the flywheel is mounted on the transmission output shaft so that the transmission output shaft extends through a bore of the flywheel such that the flywheel can spin freely relative to the output shaft, wherein the transmission output shaft is cantilevered from the drive input shaft.

3. The powered square baler of claim 2 wherein the transmission also comprises an inner hub mounted on the flywheel such that rotation of the baler input shaft causes corresponding rotation of the flywheel and the inner hub, the inner hub configured for free relative rotational movement with the output shaft.

4. The powered square baler of claim 3 wherein the sun gear is mounted on the inner hub to rotate with the inner hub, and the carrier is rotatably mounted on the inner hub with a bearing such that the carrier is operable to spin relative to the inner hub and the carrier is also mounted to the transmission output shaft with an outer hub, such that the carrier spins with the transmission output shaft.

5. The powered square baler of claim 1 wherein the transmission assembly further comprises a belt drive comprising a drive sheave, a driven sheave, and an endless belt drivingly entrained about the drive and driven sheaves, wherein the drive sheave is mounted on the baler input shaft to rotate therewith.

6. The powered square baler of claim 5 wherein the flywheel is mounted to the driven sheave to rotate therewith such that the belt drive transmits power between the baler input shaft and the flywheel.

7. The powered square baler of claim 6 wherein the driven sheave is smaller than the drive sheave so that the belt drive increases the rotational speed from the drive sheave to the driven sheave.

8. The powered square baler of claim 1 wherein the caliper clutch assembly is preferably normally in the releasing condition so as to be frictionally disengaged from the clutch disc thereby causing the planetary gear train to restrict power transmission, and when the caliper clutch assembly is in the braking condition, the caliper clutch assembly frictionally restricts rotation of the ring gear during operation of the planetary gear train, thereby rotation of the flywheel causes rotation of the sun gear, which causes rotation of the planet gears and because the ring gear does not rotate, rotation of the planet gears causes corresponding rotation of the carrier, which causes rotation of the transmission output shaft so that the planetary gear train transmits power from the flywheel to the transmission output shaft.

9. The powered square baler of claim 8 wherein when the caliper clutch assembly is in the releasing condition, the caliper clutch assembly is substantially frictionally disengaged from the clutch disc to permit free rotation of the clutch disc and ring gear such that the planetary gear train restricts power transmission from the flywheel to the transmission output shaft such that rotation of the flywheel and the sun gear causes rotation of the planet gears and corresponding rotation of the ring gear without resulting in rotation of the carrier and the output shaft so that the planetary gear train provides a slip mechanism that restricts power transfer to the transmission output shaft.

10. The powered square baler of claim 1 wherein the caliper clutch assembly is operable to be shifted between the braking and releasing conditions to control the amount of torque transmitted between the flywheel and the transmission output shaft by the planetary gear train to provide a preferred transition into operation of the plunger drive and plunger assembly.

11. The powered square baler of claim 1 wherein the planetary gear train also includes a manual wheel grip, wherein the wheel grip is comprises an annular ring mounted on the carrier.

12. The powered square baler of claim 1 wherein caliper clutch assembly includes a frame, a fixed pad, and a shiftable pad powered by a piston, the fixed pad being attached to the frame and the shiftable pad being slidably mounted on the frame, wherein the shiftable pad can be selectively moved by the operator between a braking condition where the shiftable and fixed pads are close to one another and a releasing condition where the shiftable and fixed pads are relatively further away from one another when compared to the braking condition, and wherein the shiftable and fixed pads can also be shifted to one of numerous positions between the braking and releasing condition to provide continuously variable braking adjustment between the braking and releasing conditions, wherein in the braking condition, the shiftable and fixed pads are frictionally engaged with corresponding braking surfaces to restrict rotation of the clutch disc and ring gear and in the releasing condition, the shiftable pad is moved out of substantial frictional engagement with the clutch disc to permit free rotation of the clutch disc and ring gear.

* * * * *